US012709054B2

(12) United States Patent
Leibig et al.

(10) Patent No.: US 12,709,054 B2
(45) Date of Patent: Aug. 18, 2026

(54) THREE-DIMENSIONAL PRINTING OF A FUNCTIONALLY GRADED ROBOTIC END EFFECTOR

(71) Applicant: CHROMATIC 3D MATERIALS INC., Golden Valley, MN (US)

(72) Inventors: Cora Leibig, Maple Grove, MN (US); Michael Garrod, Minnetrista, MN (US)

(73) Assignee: CHROMATIC 3D MATERIALS INC., Golden Valley, MN (US)

( * ) Notice: Subject to any disclaimer, the term of this patent is extended or adjusted under 35 U.S.C. 154(b) by 493 days.

(21) Appl. No.: 17/635,361

(22) PCT Filed: Aug. 14, 2020

(86) PCT No.: PCT/US2020/046338
§ 371 (c)(1),
(2) Date: Feb. 14, 2022

(87) PCT Pub. No.: WO2021/030675
PCT Pub. Date: Feb. 18, 2021

(65) Prior Publication Data

US 2022/0274315 A1 Sep. 1, 2022

Related U.S. Application Data

(60) Provisional application No. 62/887,397, filed on Aug. 15, 2019.

(51) Int. Cl.
*B29C 64/106* (2017.01)
*B32B 5/20* (2006.01)
(Continued)

(52) U.S. Cl.
CPC .............. *B29C 64/106* (2017.08); *B32B 5/20* (2013.01); *B33Y 10/00* (2014.12); *B33Y 70/00* (2014.12);
(Continued)

(58) Field of Classification Search
CPC ....... B29C 64/106; B33Y 70/00; B33Y 10/00; B33Y 80/00; B32B 5/20
(Continued)

(56) References Cited

U.S. PATENT DOCUMENTS

| | | | |
|---|---|---|---|
| 5,114,989 | A | 5/1992 | Elwell et al. |
| 9,707,717 | B2 | 7/2017 | Sand |

(Continued)

FOREIGN PATENT DOCUMENTS

| | | | |
|---|---|---|---|
| CA | 2295548 | A1 | 1/1999 |
| CN | 106832833 | A | 6/2017 |

(Continued)

OTHER PUBLICATIONS

Machine_English_translation_JP_08300289_A; Iwakawa et al.; Robot Hand Finger; Nov. 19, 1996; EPO; whole document (Year: 2024 ).*

(Continued)

*Primary Examiner* — Tahseen Khan
(74) *Attorney, Agent, or Firm* — LELKES IP; Robert S. Lelkes

(57) ABSTRACT

A robotic end effector comprising at least two fingers connected through joints and a deformable pad on an exterior of the at least two fingers, wherein the deformable pad comprises a functionally graded hardness. A method for three dimensional printing of a deformable pad of a robotic end effector, comprising depositing a first material on an exterior of at least two fingers connected through joints, and depositing a second material on an exterior of the at least two fingers connected through joints, to produce a deformable pad, wherein the first material and the second material have a different hardness and the deformable pad comprises a functionally graded hardness.

17 Claims, 2 Drawing Sheets

(51) Int. Cl.

| | |
|---|---|
| ***B33Y 10/00*** | (2015.01) |
| ***B33Y 70/00*** | (2020.01) |
| ***B33Y 80/00*** | (2015.01) |
| *B29C 64/30* | (2017.01) |
| *B29K 101/10* | (2006.01) |
| *B32B 7/022* | (2019.01) |
| *B33Y 40/10* | (2020.01) |

(52) U.S. Cl.

CPC .............. *B33Y 80/00* (2014.12); *B29C 64/30* (2017.08); *B29K 2101/10* (2013.01); *B32B 7/022* (2019.01); *B32B 2307/536* (2013.01); *B33Y 40/10* (2020.01)

(58) Field of Classification Search

USPC .......................................................... 428/217

See application file for complete search history.

(56) References Cited

U.S. PATENT DOCUMENTS

| | | | | |
|---|---|---|---|---|
| 11,065,816 | B2 | 7/2021 | Leibig et al. | |
| 2013/0015596 | A1 | 1/2013 | Mozeika et al. | |
| 2014/0020192 | A1 * | 1/2014 | Jones ..................... | A43B 13/14 12/146 B |
| 2015/0292968 | A1 * | 10/2015 | Vogt ...................... | G01L 5/1623 73/862.581 |
| 2015/0352787 | A1 | 12/2015 | Humbert et al. | |
| 2016/0279805 | A1 * | 9/2016 | Murota .................. | B25J 15/008 |
| 2017/0017317 | A1 | 1/2017 | Wang | |
| 2019/0168446 | A1 | 6/2019 | Leibig et al. | |
| 2022/0219380 | A1 | 7/2022 | Leibig et al. | |

FOREIGN PATENT DOCUMENTS

| | | | | |
|---|---|---|---|---|
| CN | 107400192 | A | | 11/2017 |
| EP | 3434428 | A2 | | 1/2019 |
| JP | S60167789 | A | | 8/1985 |
| JP | 08300289 | A | * | 11/1996 |
| JP | 2004174625 | A | | 6/2004 |
| JP | 2004174626 | A | | 6/2004 |
| JP | 4962728 | B2 | | 6/2012 |
| JP | 2015217439 | A | * | 12/2015 |
| WO | 2014210099 | A1 | | 12/2014 |
| WO | 2019030267 | A1 | | 2/2019 |

OTHER PUBLICATIONS

Machine_English_translation_JP_2015217439_A; Hachiya et al.; Robot Hand; Dec. 7, 2015; EPO; whole document (Year: 2024).*

Yang, Yang, "Innovative Design of Embedded Pressure and Position Sensors for Soft Actuators", IEEE Robotics and Automation Letters, vol. 3, No. 2, (Apr. 2018), pp. 656-663.

International Search Report and Written Opinion, PCT/US2020/046338, Nov. 30, 2020, 17 pages.

English translation of Office action dated Jun. 27, 2025, received from Chinese IP Office (SIPO) in Chinese application No. 202080069045.8, which is a Chinese counterpart to U.S. Appl. No. 17/635,361.

* cited by examiner

THREE-DIMENSIONAL PRINTING OF A FUNCTIONALLY GRADED ROBOTIC END EFFECTOR

RELATED APPLICATIONS

This application is a National phase application of International application PCT/US2020/046338, filed Aug. 14, 2020, which claims priority to U.S. Provisional application 62/887,397 filed Aug. 15, 2019; and is a continuation in part of U.S. application Ser. No. 17/613,920, filed Nov. 23, 2021, which is a continuation of International application PCT/US2020/034181, filed May 22, 2020, which in turn claims priority to U.S. Provisional application 62/851,902, filed May 23, 2019; is a continuation-in-part of U.S. patent application Ser. No. 16/433,324, filed Jun. 6, 2019, which is a National phase application of International application PCT/US2017/064941 filed Dec. 6, 2017, which claims priority to U.S. Provisional application 62/524,214, filed Jun. 23, 2017 and to U.S. Provisional application 62/430,919, filed Dec. 6, 2016; and is a continuation-in-part of U.S. application Ser. No. 16/256,657, filed Jan. 24, 2019, now U.S. Pat. No. 10,639,842, which is a National phase application of International application PCT/US2018/064323, filed Dec. 6, 2018, which claims priority to U.S. Provisional patent application 62/595,400, filed Dec. 6, 2017; and is a continuation-in-part of U.S. application Ser. No. 16/749,671, filed Jan. 22, 2020, which is a continuation of U.S. application Ser. No. 16/256,657, filed Jan. 24, 2019. The contents of each of which are fully incorporated by reference herein.

FIELD

The present disclosure relates to 3D additive manufacturing methods and robotic end effectors. The application also relates to a robotic end effector prepared by 3D additive manufacturing.

BACKGROUND

Fused filament fabrication (FFF), also referred to in the art as thermoplastic extrusion, plastic, jet printing (PJP), fused filament method (FFM), or fusion deposition modeling, is an additive manufacturing process wherein a material is extruded in successive layers onto a platform to form a three-dimensional (3D) product. Typically, FFF uses a melted thermoplastic material that is extruded onto a platform. Three-dimensional printing (3D printing) sometimes uses support structures that are easily dissolved or removed from the part after printing.

Disadvantages of existing FFF technology using thermoplastics include single material property printing, limited print-direction strength, limited durability, and limited softness. Thermosetting materials have generally not been used in FFF because prior to cure, the monomers are low viscosity liquids, and upon deposition, the curing liquid flows or breaks into droplets, resulting in finished parts of low quality and undesirably low resolution. Attempts to print with thermoset materials has required addition of fillers (such as inorganic powders or polymers) to induce thixotropic behavior in the resin before it is fully cured. These solutions adversely affect the final properties of the printed part. Other problems include poor resolution control in the printed part and frequent clogging of mixing systems.

Manufacturers use robots equipped with robotic end effectors. These end effectors are used to grasp, pick up, move, and place objects. End effectors generally have complex, multi-jointed structures and sophisticated actuation mechanisms that are expensive and difficult to design. These robots equipped with robotic end effectors are designed to grasp, pick up, move, and place the same object many times. End effectors often have difficulty grasping objects of differing sizes.

SUMMARY

The present disclosure is related to robotic end effectors, 3D printing methods, and 3D printed objects.

In certain embodiments, the present disclosure is directed to a robotic end effector comprising: at least two fingers connected through joints; and a deformable pad on an exterior of the at least one finger, wherein the deformable pad comprises a functionally graded hardness material.

In certain embodiments, the functionally graded hardness comprises a soft hardness material on the exterior of the at least two fingers and a hard hardness material on an exterior of the hard hardness material. In certain embodiments, the functionally graded hardness comprises a hard hardness material on the exterior of the at least two fingers and a soft hardness material on the exterior of the soft hardness material. In certain embodiments, the functionally graded hardness comprises an area of hard hardness material and an area of soft hardness material on the exterior of the at least two fingers.

In certain embodiments, the functionally graded hardness comprises a plurality of areas of hard hardness material and a plurality of areas of soft hardness material on the exterior of the at least two fingers. In certain embodiments, the functionally graded hardness comprises a soft hardness material at a tip of the at least two fingers and a hard hardness material at a base of the at least two fingers. In certain embodiments, the functionally graded hardness comprises a hard hardness material at a tip of the at least two fingers and a soft hardness material at a base of the at least two fingers.

In certain embodiments, the area of hard hardness material and the area of soft hardness material are evenly distributed on the at least two fingers. In certain embodiments, the area of hard hardness material and the area of soft hardness material are unevenly distributed on the at least two fingers. In certain embodiments, the robotic end effector comprises linear functionally graded hardness material. In certain embodiments, the robotic end effector comprises a nonlinear functionally graded hardness material.

In certain embodiments, the robotic end effector comprises one or more sensors. In certain embodiments, the one or more sensors is located in the deformable pad. In certain embodiments, the one or more sensors provides haptic feedback.

In certain embodiments, the robotic end effector comprises at least three fingers. In certain embodiments, the robotic end effector comprises at least four fingers. In certain embodiments, the robotic end effector comprises at least five fingers.

In certain embodiments, the exterior of the deformable pad comprises a corrugated surface.

In certain embodiments, the deformable pad comprises a thermoset material. In certain embodiments, a thermosetting material used to form the thermoset material comprises an isocyanate, an isocyanate prepolymer, a urethane, a urea-containing polymer, a polyol prepolymer, an amine prepolymer, a polyol containing at least one terminal hydroxyl group, a polyamine containing at least one amine that contains an isocyanate reactive hydrogen, or mixtures thereof.

In certain embodiments, the deformable pad comprises a foam and a solid elastomer. In certain embodiments, the deformable pad comprises a urethane or a silicone.

In certain embodiments, the functionally graded hardness ranges from Shore A 10 to Shore D 100. In certain embodiments, the functionally graded hardness ranges from about Shore A 40 to 90, about Shore 00 of 20 to Shore D of 80, or from about 15 lbs to about 70 lbs (as measured by Indentation Load Deflection test). In certain embodiments, the soft hardness is about Shore A 10 and the hard hardness is about Shore D 100.

In certain embodiments, the present disclosure is directed to a method for three dimensional printing of a deformable pad of a robotic end effector, comprising: depositing a first material on an exterior of at least two fingers connected through joints, and depositing a second material on an exterior of the at least two fingers connected through joints, to produce a deformable pad, wherein the first material and the second material have a different hardness and the deformable pad comprises a functionally graded hardness.

In certain embodiments, the depositing of the first material completely encompasses the at least two fingers and the depositing of the second material is on the first material. In certain embodiments, the depositing of the first material is on an area of the at least two fingers and the depositing of the second material is on a different area of the at least two fingers. In certain embodiments, the depositing of the first material is on a base of the at least two fingers and the depositing of the second material is on a tip of the at least two fingers.

In certain embodiments, the depositing of the first material and the depositing of the second material are evenly distributed on the exterior of the at least two fingers. In certain embodiments, the depositing of the first material and the depositing of the second material are unevenly distributed on the exterior of the at least two fingers. In certain embodiments, the first material comprises a hard hardness and the second material comprises a soft hardness. In certain embodiments, the first material comprises a soft hardness and the second material comprises a hard hardness. In certain embodiments, the method comprises a linear functionally graded hardness. In certain embodiments, the method comprises a nonlinear functionally graded hardness.

In certain embodiments of the method, the deformable pad comprises one or more sensors. In certain embodiments of the method, the one or more sensors is located in the deformable pad. In certain embodiments of the method, the one or more sensors provides haptic feedback.

In certain embodiments of the method, the robotic end effector comprises at least three fingers. In certain embodiments of the method, the robotic end effector comprises at least four fingers. In certain embodiments of the method, the robotic end effector comprises at least five fingers.

In certain embodiments of the method, the exterior of the deformable pad comprises a corrugated surface.

In certain embodiments of the method, the first material and/or the second material comprises a thermosetting material. In certain embodiments of the method, the thermosetting material comprises an isocyanate, an isocyanate prepolymer, a urethane, a urea-containing polymer, a polyol prepolymer, an amine prepolymer, a polyol containing at least one terminal hydroxyl group, a polyamine containing at least one amine that contains an isocyanate reactive hydrogen, or mixtures thereof.

In certain embodiments of the method, the first material and/or the second material independently comprises a foam or a solid elastomer. In certain embodiments of the method, the first material and/or the second material independently comprises a urethane or a silicone.

In certain embodiments of the method, the functionally graded hardness ranges from Shore A 10 to Shore D 100. In certain embodiments of the method, the functionally graded hardness ranges from about Shore A 40 to 90, about Shore 00 of 20 to Shore D of 80, or about 15 lbs to about 70 lbs (as measured by Indentation Load Deflection test). In certain embodiments of the method, the soft hardness is about Shore A 10 and the hard hardness is about Shore D 100.

DETAILED DESCRIPTION

Figure 1:
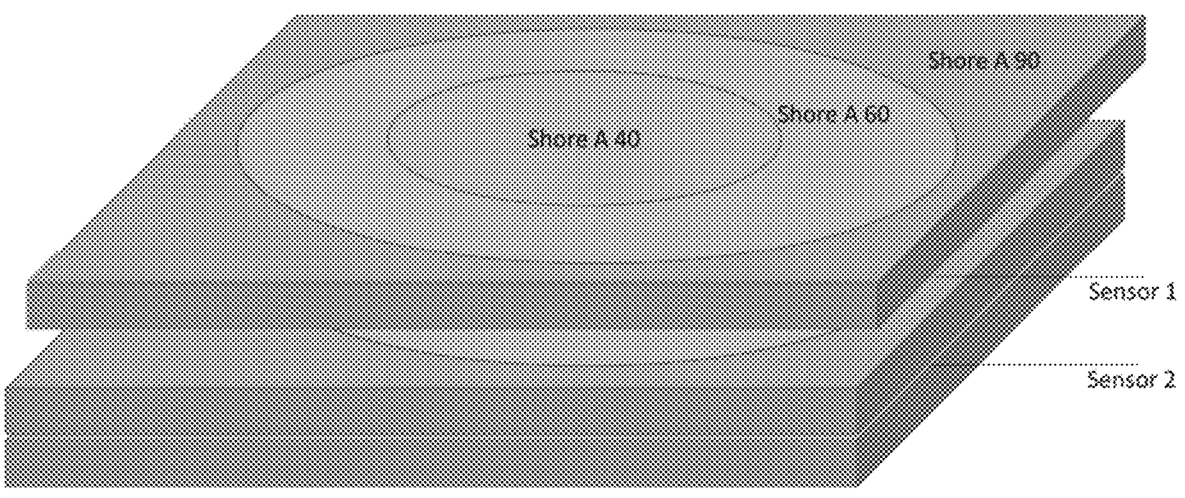
FIG. 1 depicts a deformable pad having a functionally graded hardness with three hardness materials and two embedded sensors.
Figure 2:
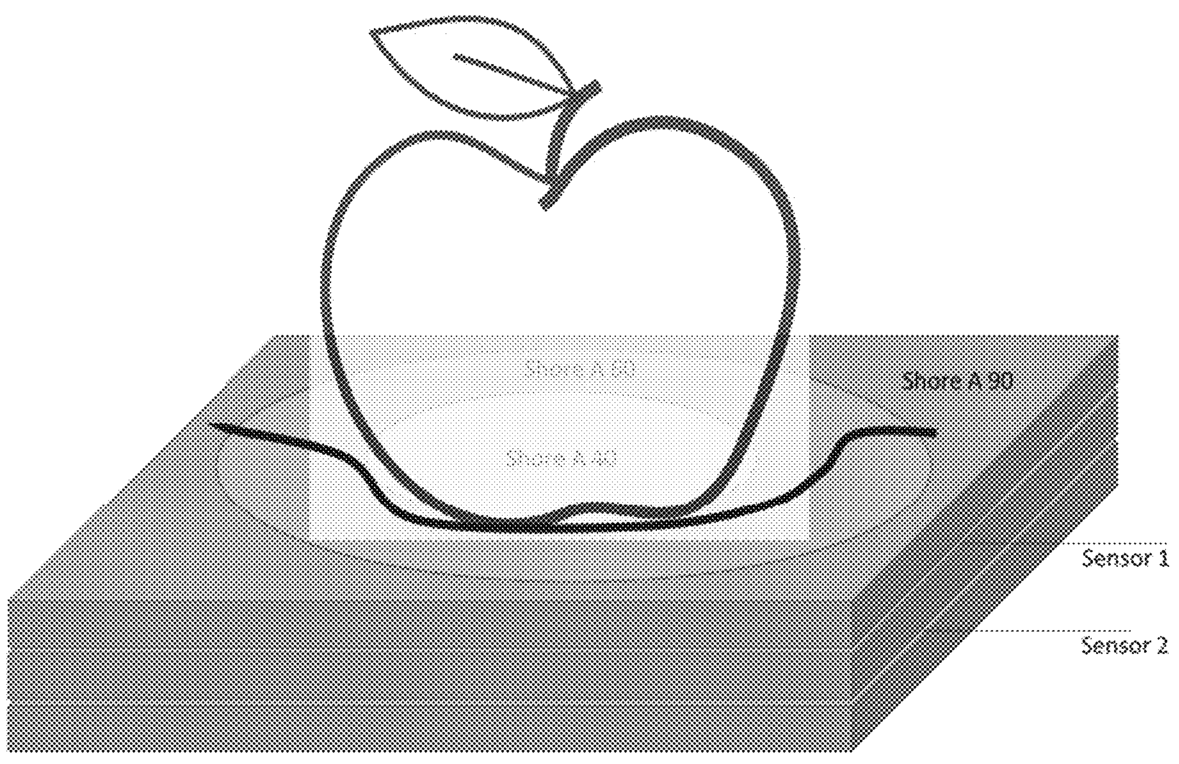
FIG. 2 depicts a deformable pad having a functionally graded hardness with three hardness materials and two embedded sensors and use of the deformable pad to conform to the shape of an apple.

Embodiments of the disclosure relate to a robotic end effector comprising at least two fingers connected through joints; and a deformable pad on an exterior of the at least two fingers, wherein the deformable pad comprises a functionally graded hardness.

Embodiments of the disclosure also relate to method for three dimensional printing of a deformable pad of a robotic end effector, comprising: depositing a first material on an exterior of at least two fingers connected through joints, and depositing a second material on an exterior of at least two fingers connected through joints, to produce a deformable pad, wherein the first material and the second material have a different hardness and the deformable pad comprises a functionally graded hardness.

In certain embodiments, the present disclosure is directed to a deformable pad comprising a first material and a second material, wherein the first material and the second material have a different hardness and the deformable pad comprises a functionally graded hardness.

In certain embodiments, the present disclosure is directed to a method for 3D printing a deformable pad, comprising depositing a first material and depositing a second material to produce a deformable pad, wherein the first material and the second material have a different hardness and the deformable pad comprises a functionally graded hardness.

In certain embodiments, the present disclosure is directed to a method for preparing a robotic end effector, comprising 3D printing a deformable pad comprising a first material and a second material, wherein the first material and the second material have a different hardness and the deformable pad comprises a functionally graded hardness, and adhering the deformable pad to one or more fingers of a robotic structure.

In certain embodiments, the end effector deformable pad can have selective flexibility. The pad can conform to the shape of an object that is to be manipulated to maximize the surface area of contact with the object, minimize surface pressure, and prevent slippage. The deformable pad according to embodiments of the disclosure can minimize potential damage or deformation to the object that is to be lifted.

In certain embodiments, an increase in hardness through the depth of the pad can prevent deformation of the deformable pad and can provide pressure transfer to a sensor while also providing strength to the deformable pad.

It has been surprisingly and unexpectedly found that a robotic end effector having a functionally graded hardness can reduce the number of joints required to attain the same level or a superior level of grip as compared to an end effector not having a functionally graded hardness.

It has also been surprisingly and unexpectedly found that a robotic end effector having a functionally graded hardness can grasp, pick up, move, and place objects of a variety of sizes. Because the disclosed end effectors can grasp, pick up, move, and place objects of a variety of sizes, they can streamline and enhance robotics use.

For example, the disclosed end effectors can be useful for grasping, picking up, moving, and placing fruit or vegetables, which naturally have a variety of sizes and shapes. As an additional example, the disclosed end effectors can be useful in a warehouse for grasping, picking up, moving, and placing boxes or objects having a variety of sizes and shapes.

In certain embodiments, to further aid selective flexibility and allow the deformable pad to conform to the object being manipulated, the deformable pad can be constructed using open structures. In certain embodiments, these open structures can be designed to selectively deform under pressure, which further improves gripping pressure across the surface of irregular shaped objects.

In certain embodiments, an end effector having a functionally graded hardness can allow for a reduction in phalanges necessary to deform to the shape of the object and to move the object without breakage, while increasing the amount of force that can be used to lift and manipulate the object.

It has been found that a deformable pad in accordance with the disclosure surprisingly and unexpectedly durable and resilient. In certain embodiments, the deformable pad can reverts back to its original shape after single use. In certain embodiments, the deformable pad has less than 10% change in hardness or sensitivity, or does not tear, for 10, 100, 1000 repeat uses. In certain embodiments, the embedded sensors can be used to detect when it is time to replace a used deformable pad with a new deformable pad. In certain embodiments, a sensor can detect if a replacement deformable pad is needed when the sensor closest to the surface detects pressure at the same level as the deep sensor.

Various examples and embodiments of the subject matter disclosed are possible and will be apparent to a person of ordinary skill in the art, given the benefit of this disclosure. In this disclosure reference to "some embodiments." "certain embodiments," "certain exemplary embodiments" and similar phrases each means that those embodiments are non-limiting examples of the inventive subject matter, and there may be alternative embodiments which are not excluded.

The articles "a," "an," and "the" are used herein to refer to one or more than one (i.e., to at least one) of the grammatical object of the article. By way of example, "an element" means one element or more than one element.

As used herein, the term "about" means ±10% of the noted value. By way of example only, at least "about 50% harder" could include from at least 45% harder up to and including at least 55% harder.

The word "comprising" is used in a manner consistent with its open-ended meaning, that is, to mean that a given product or process can optionally also have additional features or elements beyond those expressly described. It is understood that wherever embodiments are described with the language "comprising," otherwise analogous embodiments described in terms of "consisting of" and/or "consisting essentially of" are also contemplated and within the scope of this disclosure.

As used herein, the term "additive manufacturing" means extruded printing of thermosetting material.

As used herein, an "exterior" of the at least two fingers means at least a portion of the exposed outermost portion of the fingers, any portion of a side or the sides of the fingers, anywhere on the fingers that could be exposed to air or liquid in a chamber, and any outer portion of the fingers. The exterior can be of regular shape, irregular shape, complex shape, have sides of equal dimension, have sides of unequal dimension, and includes cavities, gaps, or holes in the fingers.

As used herein, the term "finger" is the portion of the end effector that grasps, picks up, moves, and/or placed an object when used as a robotic end effector. A "finger" can also be considered a phalange or a gripper. The tip of a finger is positioned near or at the end of the finger and is the furthest part of the finger away from the robotic arm. The base of a finger is positioned near or at the bottom of the finger and is the closest part of the finger away from or is in contact with the robotic arm. A tip or a base is not a single point, but can instead be a general area (i.e., area around the tip or area around the base). A finger can be multi-jointed, a finger can be single-jointed, and a finger can have no joints.

As used herein, the terms "thermoset," "thermoset product," and "thermoset material" are used interchangeably and refer to the reaction product of at least two chemicals which form a covalently bonded crosslinked or polymeric network. In contrast to thermoplastics, a thermoset product described herein can irreversibly solidify or set.

As used herein, the term "thermosetting material" refers to a covalently bonded crosslinked or polymeric network that is still reactive, e.g., it can still have hydroxyl, amine, and/or isocyanate functionality that gives a measurable hydroxyl number, NH number, or NCO number in a titration. In one embodiment, a thermosetting material can have a viscosity below 3,000,000 cp. In one embodiment, thermosetting material can have a molecular weight of no greater than 100,000 g/mol.

Robotic End Effector

In certain embodiments, the present disclosure is directed to robotic end effector comprising at least two fingers connected through joints; and a deformable pad on an exterior of at least one finger, wherein the deformable pad comprises a functionally graded hardness material.

In certain embodiments, the functionally graded hardness material can comprise two materials, three materials, four materials, five materials, or six materials. In certain embodiments each material can comprise a mixture of different materials. In certain embodiments, the mixture of different materials can effect a gradual transition from one hardness to a different hardness.

In certain embodiments, the functionally graded hardness comprises a soft hardness material on the exterior of at least two fingers and a hard hardness material on an exterior of the hard hardness material.

In certain embodiments, the functionally graded hardness comprises a hard hardness material on the exterior of at least one finger and a soft hardness material on the exterior of the soft hardness material.

In certain embodiments, the functionally graded hardness comprises an area of hard hardness material and an area of soft hardness material on the exterior of the at least two fingers. In certain embodiments, the functionally graded hardness comprises a plurality of areas of hard hardness material and a plurality of areas of soft hardness material on the exterior of the at least two fingers.

In certain embodiments, the area of hard hardness material and the area of soft hardness material are evenly distributed on at least two fingers. In certain embodiments, the area of hard hardness material and the area of soft hardness material are unevenly distributed on at least two fingers. In certain embodiments, one or more fingers can be a dexterous digit. In certain embodiments, one or more fingers can be a fixed digit. In certain embodiments, one or more of the fingers comprises a deformable pad and one or more of the fingers does not comprise a deformable pad.

In certain embodiments, the functionally graded hardness comprises a soft hardness material at a tip of the at least two fingers and a hard hardness material at a base of at least two fingers.

In certain embodiments, the functionally graded hardness comprises a hard hardness material at a tip of at least two fingers and a soil hardness material at a base of at least two fingers.

In certain embodiments, the robotic end effector comprises one or more sensors. In certain embodiments, one or more sensors is located in the deformable pad. In certain embodiments, the one or more sensors provides haptic feedback. In certain embodiments, the one or more sensors can guide the robotic end effector to improve in grasping, picking up, moving, and placing objects.

In certain embodiments, the robotic end effector comprises at least three fingers. In certain embodiments, the robotic end effector comprises at least four fingers. In certain embodiments, the robotic end effector comprises at least five fingers.

In certain embodiments, the exterior of the deformable pad comprises a corrugated surface.

In certain embodiments, the deformable pad comprises a thermoset material. In certain embodiments, the thermosetting material used to form the thermoset material comprises an isocyanate, an isocyanate prepolymer, a urethane, a urea-containing polymer, a polyol prepolymer, an amine prepolymer, a polyol containing at least one terminal hydroxyl group, a poly amine containing at least one amine that contains an isocyanate reactive hydrogen, or mixtures thereof.

In certain embodiments, the deformable pad comprises a foam and a solid elastomer. In certain embodiments, the deformable pad comprises a urethane or a silicone.

In certain embodiments, the soft hardness is about Shore A 10 and the hard hardness is about Shore 100.

In certain embodiments, the functionally graded hardness can range from about Shore A 40 to 90, about Shore 00 of 20 to Shore D of 80. In certain embodiments, the functionally graded hardness can range from foam hardness from about 15 lbs to about 70 lbs (as measured by Indentation Load Deflection test).

In certain embodiments, the deformable pad can constitute an entire finger. In other words, there is no additional object (other than potentially mechanically controlled joints or sensors) that represent the finger other than the deformable pad (i.e., there is no object in the finger separate from the thermoset materials and potentially mechanically controlled joints or sensors). In certain embodiments, the finger is 3D printed prior to 3D printing the deformable pad on the 3D printed finger.

In certain embodiments, the finger can comprise an object separate from the thermoset materials, such as a metal or a polymer. In certain embodiments, the finger is not an object produced by 3D printing.

Functionally Graded Hardness

As used herein, the term "functionally graded" means an increase from one value to another value. In certain embodiments, the gradation can be smooth and/or continuous. In certain embodiments, the gradation can be discrete and/or stepwise. In certain embodiments, the gradation can be from a tip of a finger to a base of a finger. In certain embodiments, the gradation can be within the depth and/or thickness of a material. In certain embodiments, the rate of gradation can be low or high. In certain embodiments, the gradation can be linear. In certain embodiments, the gradation can be non-linear. In the context of a "functionally graded" hardness, the phrase means that the hardness increases from one value to another.

Hardness refers to the amount of pressure that needs to be applied to deform a material a certain distance. In certain embodiments, a material can have a Shore A hardness from about 20 to about 120. In certain embodiments, the hardness can be a Shore A value of at least about 20, at least about 30, at least about 40, at least about 50, at least about 60, at least about 70, at least about 80, at least about 90, at least about 100, at least about 110, or at least about 120. In certain embodiments, the hardness can be a Shore A value of no greater than about 120, no greater than about 110, no greater than about 100, no greater than about 90, no greater than about 80, no greater than about 70, no greater than about 60, no greater than about 50, no greater than about 40, no greater than about 30, or no greater than about 20.

In certain embodiments, a material can have a hardness of about Shore OO 20 to about Shore D of 100. In certain embodiments, a material can have a hardness of from about Shore OO 20 to Shore A 90. In certain embodiments, a material can have a hardness of from about Shore A 40 to Shore A 90. In certain embodiments, a material can have a hardness of from about Shore A 50 to Shore D 100

In certain embodiments, a material can have a Shore D hardness from about 3 to about 120. In certain embodiments, the hardness can be a Shore D value of at least about 30, at least about 40, at least about 50, or at least about 60. In certain embodiments, the hardness can be a Shore D value of no greater than about 120, no greater than about 110, no greater than about 90, no greater than about 80, or no greater than 7 about 0.

Hardness can measured using a durometer, such as an ASTM D2240 diameter. While the hardness of non-foams can be measured using the Shore hardness scale, foams can be too soft for the Shore hardness scale. Units of hardness for foams can be Indentation Force Deflection (In)), and the standard is set out by the Polyurethane Foam Association (Joint Industry Foam Standards and Guidelines. Section 4.0, available on the world wide web at www.pfa.org/jifsg/jifsgs4.html), the amount of force, in pounds, required to indent a 50 sq in foot 25% of its thickness, referred to as 25% IFD. In one embodiment, a hardness can be about a 25% from at least about 15 lbs, at least about 20 lbs, at least about 30 lbs, or at least about 35 lbs. In certain embodiments, the hardness can be about a 25% IFD to no greater than about 60 lbs., no greater than about 50 lbs., or no greater than about 40 lbs. In certain embodiments, more rigid foams can be characterized by compression resistance of 10% deflection, as defined in ASTM D1621, or according to bending strength as defined in EN 12089. In certain embodiments, a rigid foam can have compression resistance ranging from about 25 kPa to about 200 kPa, or a bending strength between about 150 kPa and about 2000 kPa.

Method for Three Dimensional Printing of a Deformable Pad of a Robotic End Effector In certain embodiments, the present disclosure is related to a method for three dimensional printing of a deformable pad of a robotic end effector, comprising depositing a first material on an exterior of at least two fingers connected through joints, and depositing a second material on an exterior of the at least two fingers connected through joints, to produce a deformable pad, wherein the first material and the second material have a different hardness and the deformable pad comprises a functionally graded hardness.

In certain embodiments, the depositing of the first material completely encompasses at least two fingers and the depositing of the second material is on the first material.

In certain embodiments, the depositing of the first material is on an area of the at least two fingers and the depositing of the second material is on a different area of the at least two fingers.

In certain embodiments, the depositing of the first material and the depositing of the second material are evenly distributed on the exterior of the at least two fingers. In certain embodiments, the depositing of the first material and the depositing of the second material are unevenly distributed on the exterior of the at least two fingers.

In certain embodiments, wherein the first material comprises a hard hardness and the second material comprises a soft hardness. In certain embodiments, the first material comprises a soft hardness and the second material comprises a hard hardness.

In certain embodiments, the deformable pad comprises one or more sensors. In certain embodiments, the one or more sensors is located in the deformable pad. In certain embodiments, the one or more sensors provides haptic feedback.

In certain embodiments, the robotic end effector comprises at least three fingers. In certain embodiments, the robotic end effector comprises at least four fingers. In certain embodiments, the robotic end effector comprises at least five fingers.

In certain embodiments, the exterior of the deformable pad comprises a corrugated surface.

In certain embodiments, the first material and/or the second material comprises a thermosetting material. In certain embodiments, the thermosetting material comprises an isocyanate, an isocyanate prepolymer, a urethane, a urea-containing polymer, a polyol prepolymer, an amine prepolymer, a polyol containing at least one terminal hydroxyl group, a polyamine containing at least one amine that contains an isocyanate reactive hydrogen, or mixtures thereof.

In certain embodiments, the first material and/or the second material independently comprises a foam or a solid elastomer.

In certain embodiments, the first material and/or the second material independently, comprises a urethane or a silicone.

In certain embodiments, the functionally graded hardness ranges from Shore A 10 to Shore D 100.

In certain embodiments, the functionally graded hardness can range from about Shore A 40 to 90, about Shore 00 of 20 to Shore D of 80. In certain embodiments, the functionally graded hardness can range from foam hardness from about 15 lbs to about 70 lbs (as measured by indentation Load Deflection test).

In certain embodiments, the deformable pad can constitute an entire finger. In other words, there is no additional object (other than potentially mechanically controlled joints or sensors) that represent the finger other than the deformable pad (i.e., there is no object in the finger separate from the thermoset materials and potentially mechanically controlled joints or sensors). In certain embodiments, the finger is 3D printed prior to 3D printing the deformable pad on the 31) printed finger.

In certain embodiments, the finger can comprise an object separate from the thermoset materials, such as a metal or a polymer. In certain embodiments, the finger is not an object produced by 3D printing.

Thermosetting Material

The thermosetting material according to embodiments of the claims can be composed of any number of materials.

In certain embodiments, the thermosetting material can be an isocyanate, an isocyanate prepolymer, a urethane, a urea-containing polymer, a polyol prepolymer, an amine prepolymer, a polyol containing at least one terminal hydroxyl group, a polyamine containing at least one amine that contains an isocyanate reactive hydrogen, or mixtures thereof.

In certain embodiments, the thermosetting material can be an isocyanate. In certain embodiments, the thermosetting material can be an isocyanate prepolymer. In certain embodiments, the thermosetting material can be a urethane. In certain embodiments, the thermosetting material can be a urea-containing polymer. In certain embodiments, the thermosetting material can be a polyol prepolymer. In certain embodiments, the thermosetting material can be an amine prepolymer. In certain embodiments, the thermosetting material can be a polyol containing at least one terminal hydroxyl group. In certain embodiments, the thermosetting material can be a polyamine containing at least one amine that contains an isocyanate reactive hydrogen.

In certain embodiments, the thermosetting material can be a urethane and/or urea-containing polymer. In certain embodiments, a urethane and/or urea-containing polymer can be a polymer which contains urethane groups (—NH—(C═O)—O—) as part of the polymer chain. The urethane linkage can be formed by reacting isocyanate groups (—N═C═0) with hydroxyl groups (—OH). A polyurethane can be produced by the reaction of an isocyanate containing at least two isocyanate groups per molecule with a compound having terminal hydroxyl groups. In certain embodiments, an isocyanate having, on average, two isocyanate groups per molecule can be reacted with a compound having, on average, at least two terminal hydroxyl groups per molecule.

In certain embodiments, a urethane and/or urea-containing polymer can be a polymer which contains urea groups (—NH—(C═O)—NH—) as part of the polymer chain. A urea linkage can be formed by reacting isocyanate groups (—N═C═O) with amine groups (e.g., $—N(R')_2$), where each R' is independently hydrogen or an aliphatic and/or cyclic group (typically a $(C_1\text{-}C_4)$alkyl group)). A polyurea can be produced by the reaction of an isocyanate containing at least two isocyanate groups per molecule with a compound having terminal amine groups.

In certain embodiments, an aliphatic group can be a saturated or unsaturated linear or branched hydrocarbon group. This term can encompass alkyl (e.g., $—CH_3$) (or alkylene if within a chain such as $—CH_2—$), alkenyl (or alkenylene if within a chain), and alkynyl (or alkynylene if within a chain) groups, for example. In certain embodiments an alkyl group can be a saturated linear or branched hydrocarbon group including, for example, methyl, ethyl, isopropyl, t-butyl, heptyl, dodecyl, octadecyl, amyl, 2-ethylhexyl, and the like. In certain embodiments, an alkenyl group can be an unsaturated, linear or branched hydrocarbon group with one or more carbon-carbon double bonds, such as a vinyl group. In certain embodiments, an alkynyl group can be an unsaturated, linear or branched hydrocarbon group with one or more carbon-carbon triple bonds. Unless otherwise indicated, an aliphatic group typically contains from 1 to 30 carbon atoms. In certain embodiments, the aliphatic group can contain 1 to 20 carbon atoms, 1 to 10 carbon atoms, 1 to 6 carbon atoms, 1 to 4 carbon atoms, or 1 to 3 carbon atoms.

In certain embodiments, a cyclic group can be a closed ring hydrocarbon group that is classified as an alicyclic group, aromatic group, or heterocyclic group, and can optionally include an aliphatic group. In certain embodiments, an alicyclic group can be a cyclic hydrocarbon group having properties resembling those of aliphatic groups. In certain embodiments, an aromatic group or aryl group can be a mono- or polynuclear aromatic hydrocarbon group. In certain embodiments, a heterocyclic group can be a closed ring hydrocarbon in which one or more of the atoms in the ring is an element other than carbon (e.g., nitrogen, oxygen, sulfur, etc.). Unless otherwise specified, a cyclic group can have 6 to 20 carbon atoms, 6 to 18 carbon atoms, 6 to 16 carbon atoms, 6 to 12 carbon atoms, or 6 to 10 carbon atoms.

In certain embodiments, a urethane and/or urea-containing polymer can be a polymer that contains both urethane and urea groups as part of the polymer chain. A polyurethane/polyurea can be produced by the reaction of an isocyanate containing at least two isocyanate groups per molecule with a compound having terminal hydroxyl groups and a compound having terminal amine groups. In certain embodiments, a polyurethane/polyurea can be produced by the reaction of an isocyanate containing at least two isocyanate groups per molecule with a compound having terminal hydroxyl groups and terminal amine groups (e.g., a hydroxyl-amine such as 3-hydroxy-n-butylamine (CAS 114963-62-1)). A reaction to make a polyurethane, a polyurea, or a polyurethane/polyurea can include other additives, including but not limited to, a catalyst, a chain extender, a curing agent, a surfactant, a pigment, or a combination thereof.

An isocyanate, which can be considered a polyisocyanate, can have the structure $R—(N{=}C{=}O)_n$, where n can be at least 2, at least 3, at least 4, at least 5, at least 6, at least 7, or at least 8, and where R can be an aliphatic and/or cyclic group. In certain embodiments, an isocyanate can have an n that is equivalent to n in methylene diphenyl diisocyanate (MDI). In certain embodiments, the isocyanate can be a di-isocyanate (e.g., $R—(N{=}C{=}O)_2$ or $(O{=}C{=}N)—R—(N{=}C{=}O)$).

Examples of isocyanates can include, but are not limited to, methylene diphenyl diisocyanate (MDI) and toluene diisocyanate (MI). Examples of MDI can include, but are not limited to, monomeric MDT, polymeric MDI, and isomers thereof. Examples of isomers of MDI having the chemical formula $C_{15}H_{10}N_2O_2$ can include, but are not limited to, 2,2'-MDI, 2,4'-MDI, and 4,4'-MDI. Examples of isomers of TIN having the chemical formula $C_9H_6N_2O_7$ can include, but are not limited to, 2,4-TDI and 2,6-TDI. In certain embodiments, examples of isocyanates can include, but are not limited to, monomeric diisocyanates and blocked polyisocyanates. In certain embodiments, examples of monomeric diisocyanates can include, but are not limited to, hexamethylene diisocyanate (HDI), methylene dicyclohexyl diisocyanate or hydrogenated MDI (HMDI), and isophorone diisocyanate (IPDI). In certain embodiments, an example of an HDI can be hexamethylene-1,6-diisocyanate. In certain embodiments, an example of an MIDI can be dicyclohexylmethane-4,4'-diisocyanate. Blocked polyisocyanates can be based on HDI or IDPI. In certain embodiments, examples of blocked polyisocyanates can include, but are not limited to, HDI trimer, HDI biuret, HDI uretidione, and IPDI trimer.

In certain embodiments, examples of isocyanates can include, but are not limited to, aromatic diisocyanates, such as a mixture of 2,4- and 2,6-tolylene diisocyanates (TDI), diphenylmethane-4,4'-diisocyanate (MDI), naphthalene-1,5-diisocyanate (NDI), 3,3'-dimethyl-4,4'-biphenylene diisocyanate (TODI), crude TDI, polymethylenepolyphenyl isocyanurate, crude MDI, xylylene diisocyanate (XDI), and phenylene diisocyanate; aliphatic diisocyanates, such as 4,4'-methylene-biscyclohexyl diisocyanate (hydrogenated MDI), hexamethylene diisocyanate (NIDI), isophorone diisocyanate (IPDI), and cyclohexane diisocyanate (hydrogenated XDI); and modified products thereof, such as isocyanurates, carbodiimides and allophanamides.

In certain embodiments, a compound having terminal hydroxyl groups ($R—(OH)_n$), where n is at least 2 (referred to herein as "di-functional"), at least 3 (referred to herein as "tri-functional"), at least 4, at least 5, at least 6, at least 7, at least 8, at least 9, and 10, where R is an aliphatic and/or cyclic group, can be a "polyol." In certain embodiments a polyol mixture can include a small amount of mono-functional compounds having a single terminal hydroxyl group.

In certain embodiments, examples of polyols can include, but are not limited to, polyester polyols and polyether polyols. In certain embodiments, examples of polyester polyols can include, but are not limited to, those built from condensation of acids and alcohols. In certain embodiments, examples can include those built from phthalic anhydride and diethylene glyol, phthalic anhydride and dipropylene glycol, adipic acid and butanediol, and succinic acid and butane or hexanediol. In certain embodiments, polyester polyols can be semi-crystalline. In certain embodiments, examples of polyether polyols can include, but are not limited to, those built from polymerization of an oxide such as ethylene oxide, propylene oxide, or butylene oxide from an initiator such as glycerol, dipropylene glycol, TPG (tripropylene glycol), castor oil, sucrose, or sorbitol.

In certain embodiments, examples of polyols can include, but are not limited to, polycarbonate polyols and lactone polyols such as polycaprolactone. In certain embodiments, a compound having terminal hydroxyl groups ($R—(OH)_n$) can have a molecular weight (calculated before incorporation of the compound having terminal hydroxyl groups into a polymer) of from about 200 Daltons to about 20,000 Daltons, such as from about 200 Daltons to about 10,000 Daltons.

In certain embodiments, a compound having terminal amine groups (e.g., $R—(N(R')_2)_n$), where n can be at least 2, at least 3, at least 4, at least 5, at least 6, at least 7, at least 8, at least 9, and 10, where R can be an aliphatic and/or cyclic group, and where each R' can be independently hydrogen or an aliphatic and/or cyclic group (e.g., a $(C_1$-$C_4)$alkyl group), can be referred to as a "polyamine." In certain embodiments, a polyamine mixture can include a small amount of mono-functional compounds having a single terminal amine group.

In certain embodiments, a suitable polyamine can be a diamine or triamine, and can be either a primary or secondary amine. In certain embodiments, a compound having terminal amine groups can have a molecular weight (calculated before incorporation of the compound having terminal hydroxyl groups into a polymer) of from about 30 Daltons to about 5000 Daltons, such as from about 40 Daltons to about 400 Daltons.

In certain embodiments, examples of polyamines can include, but are not limited to, diethyltoluene diamine, di-(methylthio)toluene diamine, 4,4'-methylenebis(2-chloroaniline), and chain extenders available under the trade names LONZACURE L15, LONZACURE M-CDEA, LONZACURE M-DEA, LONZACURE M-DTPA, LONZACURE M-MIPA, and LONZACURE DETDA.

In certain embodiments, examples of suitable polyamines can include, but are not limited to, ethylene diamine, 1,2-diaminopropane, 1,4-diaminobutane, 1,3-diaminopentane, 1,6-diaminohexane, 2,5-diamino-2,5-dimethylhexane, 2,2,4- and/or 2,4,4-trimethyl-1,6-diaminohexane, 1,11-diaminoundecane, 1,12-diaminododecane, 1,3- and/or 1,4-cyclohexane diamine, 1-amino-3,3,5-trimethyl-5-aminomethyl-cyclohexane, 2,4- and/or 2,6-hexahydrotoluylene diamine, 2,4' and/or 4,4'-diaminodicyclohexyl methane, and 3,3'-dialkyl-4,4'-diamino-dicyclohexyl methanes such as 3,3'-dimethyl-4,4-diamino-dicyclohexyl methane and 3,3'-diethyl-4,4'-diaminodicyclohexyl methane; aromatic polyamines such as 2,4- and/or 2,6-diaminotoluene and 2,4' and/or 4,4'-diamino-diphenyl methane; and polyoxyalkylene polyamines.

In certain embodiments, the term polyol and/or polyamine mixture can be a mixture of one or more polyols of varied molecular weights and functionalities, one or more polyamines of varied molecular weights and functionalities, or a combination of one or more polyols and one or more polyamines.

In certain embodiments, the present disclosure also provides the compositions described herein and a thermoset system comprising the compositions, e.g., a first reactive component and a second reactive component, and one or more optional reactive components, such as a third reactive component.

In certain embodiments, the thermosetting material can comprise at least one reactive component. In certain embodiments, the thermosetting material can comprise at least two reactive components. In certain embodiments, the thermosetting material can comprise at least three reactive components. In certain embodiments, the thermosetting material can comprise at least four reactive components.

In certain embodiments, the thermosetting material can be prepared by methods disclosed in WO 2018/106822 and PCT/US2018/064323, each of which is incorporated in its entirety herein. In certain embodiments, a method for making a thermosetting material, such as a urethane and/or urea-containing polymer thermoset product, can include introducing first and second reactive components into a mixing chamber. In certain embodiments, the first reactive component can include an isocyanate and the second reactive component can include a polyol and/or polyamine mixture. In certain embodiments, the first reactive component can include an isocyanate and the second reactive component can include a polyol. In certain embodiments, the first reactive component can include an isocyanate and the second reactive component can include a polyamine. In certain embodiments, the first reactive component can include an isocyanate and the second reactive component can include a polyol and a polyamine. The first and second reactive components can have certain characteristics including, but not limited to, viscosity, reactivity, and chemical compatibility.

In certain embodiments, the thermosetting material can be a solid thermosetting material.

In certain embodiments, the thermosetting material can be a foam thermosetting material.

In certain embodiments, the thermosetting material can be a solid thermosetting material and a foam thermosetting material.

While the following description is in the context of foams, the description can apply to thermosetting materials, including urethane and/or urea-containing polymers in general, both non-foam and foam. Foams are available in a range of hardness and resiliencies. A urethane and/or urea-containing polymer can be very durable, permitting the foam to be used repeatedly without a change in properties. This range of properties permits these materials to be used in clinical settings where rigid positioning is desirable or where pressure distribution is more desirable.

Foams of urethane and/or urea-containing polymers can be the product of a reaction between two reactant components. A range of foam properties can be achieved by altering the relative weights of formulation components to balance reaction speed, interfacial tension of the reacting mixture, and elasticity of the polymeric scaffold. In 3D printing, an extrusion nozzle can deposit material, e.g., thermosetting material, on a substrate layer by layer, following a 3D computer model of the desired 3D object.

In certain embodiments, foam precursor formulas can enable high resolution 3D deposition to form a custom 3D foam object. In certain embodiments, by partially advancing the reaction of the precursors, such as polyurethane precursors, and adjusting catalyst and surfactant levels, it is possible to deposit the thermosetting material while maintaining the desired predetermined part resolution and mechanical integrity of the foam.

The production of a foam of urethane and/or urea-containing polymers can differ from the production of a non-foam urethane and/or urea-containing polymer by the inclusion of water. Foams of urethane and/or urea-containing polymer can be formed by the simultaneous reaction of isocyanates with water to form urea linkages and produce gas, and the reaction of isocyanates with multifunctional high molecular weight alcohols to form a crosslinked elastomeric foam scaffold.

In certain embodiments, foams can be formed by reacting monomers: a di-isocyanate, water, and multi-functional alcohol (e.g., a polyol) or a multi-functional amine. The quantity of water in the formula can affect the foam density and the strength of the foam scaffold. The molecular weight of the polyol and/or polyamine mixture can determine the crosslink density of the foam scaffold and the resulting elasticity, resiliency, and hardness of the foam. In certain embodiments, a nearly stoichiometric quantity of di-isocyanate can be used to fully react with the water and a polyol and/or polyamine mixture.

In certain embodiments, prepolymer synthesis can be used to alter the cure profile of a polyurethane or polyurea system. In prepolymer synthesis, a stoichiometric excess of di-isocyanate can be reacted with a polyol and/or polyamine mixture. The resulting prepolymer can have a higher molecular weight than the starting di-isocyanate, and molecules in the pre-polymer can have isocyanate functionality and therefore still be reactive. Because of the higher molecular weight, hydrogen bonding, and/or urea linkages, the prepolymer can also have a higher viscosity. This prepolymer can be subsequently reacted with a polyol and/or polyamine mixture and water to produce a foam with substantially the same foam scaffold composition that is achievable without prepolymer synthesis. However, viscosity growth profile can be altered, typically starting higher, and increasing more slowly, and therefore the morphological features of the foam, such as foam cell size and cell stability, can result in a foam with a very different appearance.

Support foams are not a single density, hardness, or resilience, but can span a wide range of performance. The present disclosure extends the entire range of foam properties. Foam density and hardness can be interrelated: low density foams can be softer foams. A range of foam density and hardness can be achieved first by varying the level of blowing agent, such as water, in the formulation and by adjusting the extent of excess isocyanate in the formula. Increasing the degree of functionality of the components of the polyol and/or polyamine mixture e.g., incorporating some 4- or 6-functional polyols) can increase hardness and the viscosity growth rate during cure. Foam resilience can be altered by varying the polyols and/or polyamines incorporated in the formula. Memory foams can be achieved by reducing the molecular weight of the polyols and polyamines; high resiliency can be achieved by incorporating graft polyols. In certain embodiments, the foam density range can be less than 0.3 g/cm$^3$, ranging from 30-50 ILFD hardness, and resilience ranging from 10 to 50%. Foam properties can also include open cell content and closed cell content. Open cell foams can be cellular structures built from struts, with windows in the cell walls which can permit flow of air or liquid between cells, Closed cells can be advantageous for preventing air flow, such as in insulation applications.

EXAMPLES

The objects and methods described herein are now further detailed with reference to the following examples. These examples are provided for the purpose of illustration only and the embodiments described herein should in no way be construed as being limited to these examples. Rather, the embodiments should be construed to encompass any and all variations which become evident as a result of the teaching provided herein.

Example 1: Deformable Multi-Material Pad and Production Method

A deformable multi-material pad constructed by 3D printing as follows:

1) A Shore A 90 material on the base layer.
2) A sensor is placed on top of the Shore 90 material.
3) A Shore 60 material is printed in a circle on the pad, with a Shore 90 material printed on the perimeter.
4) A sensor is placed on top of this layer.
5) A final layer is printed with a Shore 40 material in a center circle, followed by a ring of Shore 60 material, followed with a perimeter of Shore 90 material.

The pad is attached to a robot arm. The second finger has either has a single material pad or a similar deformable multi-material pad.

When the end effector lifts an object, the sensor closest to the surface signals when the object is in contact, and the deepest sensor signals when compression should stop so that the object is not damaged.

Example 2: Three-Dimensional Printing of an End Effector with Embedded Sensors and Analysis of Properties Description of materials: The soft material was a 2-component polyurethane, with hardness Shore A 40. The isocyanate mixture had a weight % of isocyanate of 9%, as measured by titration. The polyol mixture was stoichiometrically matched to the isocyanate mixture at a 1:1 ratio by weight. The hard material was a 2-component polyurethane, with hardness Shore A 60. The isocyanate mixture had a weight % of isocyanate of 12%, as measured by titration. The polyol mixture was stoichiometrically matched to the isocyanate mixture at a 1:1 ratio by weight.

The product name of pressure sensor was Interlink Model 402. The printer was a German RepRap X400 printer model. The Viscotec pumps were the ViscoDuo-FDD 4/4 model Shape printed, size, type of fill:

Shape Printed: Rectangular prism

Size: 45 mm×45 mm×6.48 mm (max: 6.48-min: 5.40 mm)

Fill: Linear, solid fill (100% density)

Print Settings:

Index (Ratio of Mass of A-side to Mass of B-side): 1.20

Bead Width: 0.5 mm

Linear Extrusion Density: 0.75 E/mm

Linear Speed: F1000

Initial Layer Height: 1.05 mm (Hard resin)

Second Layer Height: 115 mm (Hard resin)

Third Layer Height: 1.10 mm (Soft resin)

Fourth layer Height: 1.15 mm (Soft resin)

Printing Steps:

a. Printed a layer of hard resin on a clean silicone mat.
b. Placed sensor 2 on top of the first layer of resin so the circular part of the sensor was in the center of the printed material.
c. Used a tongue depressor to gently touch the sensor so that it was flat on the polyurethane.
d. Printed a second layer of the hard resin on top of the sensor.
e. Changed syringes.
f. Printed a third layer on top of the part using the soft resin.
g. Placed sensor 1 on top of the third layer so that the sensor was directly above sensor 2.
h. Printed a fourth and final layer on top of the sensor.
i. If necessary, extruded a small amount of material and used a thin wood rod to move and wipe the curing material into any gaps on the fourth layer.

Material Conditioning (Time for Cure, Heat, Etc.)

Time to cure: 48 hours

Temperature of curing room: Approximately 80° F. (26.67° C.)

Humidity of curing room: 30% to 40% humidity

Sensor connection: the Interlink force-sensitive resistors were connected to an Arduino UNO, In each sensors, the sensor was connected to +5V on the Arduino. The other end of the sensor was connected to a 10K-ohm pull-down resistor and an analog input pin on the Arduino. The other end of the pull-down resistor was then connected to ground on the Arduino.

Touch Test Experiment: The first test of the sensor was a basic touch test where the block was put on a hard slate counter and then depressed very softly; then more and more force was applied with the finger directly on top of the sensor. The sensor output is a value from 0-1023, where 0 is a force that the sensor is unable to pick up and 1023 is the max theoretical force reading the Arduino can receive from the sensor. The sensor output responded first with low readings on the sensor embedded in the soft material with a light touch. As more pressure was applied, the reading for the sensor embedded in the soft material increased. Eventually (e.g.; around a value of 500 from the soft sensor), the sensor embedded in the hard material responded and the sensor output value increase. The Touch Test experiment demonstrated an ability to detect a wide range of both soft and harder pressures integral in the construction of the manipulator.

MIS Insight Electromechanical Test System (MTS) Test: The second test involved using an MIS setup with a 5 kN load cell with two parallel plates where an object could rest on top of the end effector, which was flush with the bottom plate. The MTS could be moved finely up and down to compress the object onto the end-effector. This was to replicate an end-effector picking up an object with varying force levels. The MIS was then moved over the range of sensor values for each object in increments that demonstrated the ability of the end-effector to pick up a large range of force measurements. When a new reading was about to be taken, the experimenter let one-minute pass to control for stress-relaxation and for consistent results, as relaxation effects can affect the force experienced by the object. For the tomato testing, a relaxation time of five seconds was used as the tomato dissipated the force too fast for pressures to be measured. The surface area of contact was estimated using digital caliper measurements. It was assumed that the contact surface area remained constant for all object except for the stress ball which had large visible deformation.

Results of the MTS Test are shown in Table 1:

TABLE 1

Results from MTS Testing

| Object | Surface Area of Contact ($mm^2$) | Measured Force (Newtons) | Estimated Pressure (Pa) | Sensor 1 Average Reading | Sensor 2 Average Reading |
|---|---|---|---|---|---|
| Apple | 220 | 0.22 | 10.11 | 824 | 0 |
| Apple | 220 | 0.67 | 30.33 | 823 | 0 |
| Apple | 220 | 1.33 | 60.66 | 830 | 0 |
| Apple | 220 | 2.27 | 103.12 | 840 | 199 |
| Apple | 220 | 3.34 | 151.64 | 854 | 364 |
| Horizontal Glass Jar | 251 | 13.34 | 531.66 | 85 | 0 |
| Horizontal Glass Jar | 251 | 17.79 | 708.88 | 729 | 674 |
| Horizontal Glass Jar | 251 | 22.24 | 886.10 | 847 | 848 |
| Metal Rod | 270 | 14.23 | 527.20 | 77 | 0 |
| Metal Rod | 270 | 22.24 | 823.74 | 308 | 59 |
| Metal Rod | 270 | 44.48 | 1647.49 | 671 | 557 |
| Metal Rod | 270 | 66.72 | 2471.23 | 864 | 850 |
| Metal Rod | 270 | 88.96 | 3294.98 | 939 | 934 |
| Stress Ball | 531 | 0.98 | 18.43 | 134 | 0 |
| Stress Ball | 531 | 1.11 | 20.94 | 301 | 0 |
| Stress Ball | 531 | 2.22 | 41.89 | 599 | 0 |
| Stress Ball | 551 | 3.34 | 60.55 | 715 | 0 |
| Stress Ball | 573 | 4.45 | 77.63 | 771 | 159 |
| Stress Ball | 616 | 5.56 | 90.26 | 813 | 286 |
| Stress Ball | 905 | 6.67 | 73.73 | 835 | 383 |
| Stress Ball | 1257 | 22.24 | 176.94 | 901 | 679 |
| Stress Ball | 1414 | 31.14 | 220.21 | 908 | 725 |
| Stress Ball | 1590 | 44.48 | 279.76 | 912 | 767 |
| Tomato* | 962 | 62.28 | 647.35 | 254 | 0 |
| Tomato* | 962 | 88.96 | 924.79 | 604 | 1 |
| Urethane Block | 625 | 45.82 | 733.07 | 105 | 0 |
| Urethane Block | 625 | 66.72 | 1067.57 | 471 | 462 |
| Urethane Block | 625 | 88.96 | 1423.43 | 685 | 707 |
| Urethane Block | 625 | 111.21 | 1779.29 | 842 | 848 |

*Relaxation time was 5 seconds instead of 1 minute as the object dissipated the force too fast for pressures to be measured.

Example 2 and Table 1 demonstrates that end effectors in accordance with the disclosure can surprisingly pick up objects having a wide range of sizes, shapes, and force levels, and the embedded sensors can be used to detect force when embedded in materials of different hardness (e.g., soft hardness material and hard hardness material).

What is claimed is:

1. A method for three-dimensional printing of a robotic end effector finger comprising:

depositing a first thermosetting material having a first hardness when set to form a first thermoset material, depositing a second thermosetting material having a second hardness when set to form a second thermoset material which is different than the first hardness such that the first thermoset material is connected to the second thermoset material to form at least a portion of a finger of the robotic end effector wherein at least a portion of the first thermoset material, and/or the second thermoset material form a deformable pad of the finger, and providing a first sensor and a second sensor, wherein the first thermosetting material, and the second thermosetting material are deposited layer by layer to form the portion of the finger;

wherein the depositing comprises the sequential steps of providing a first sensor;

depositing at least one layer of the first thermosetting material over the first sensor to embed the first sensor under the at least one layer of the first thermosetting material;

providing a second sensor over the first thermosetting material; and depositing at least one layer of the second thermosetting material over the second sensor to embed the second sensor under the at least one layer of the second thermosetting material.

2. The method of claim 1, wherein the first thermoset material and the second thermoset material are deposited on an exterior of a finger substrate.

3. The method of claim 1, further comprising placing the first sensor on top of a deposited layer of the first thermoset material, and depositing another layer of the first thermoset material over the first sensor.

4. The method of claim 1, wherein at least one of the first thermoset material and the second thermoset material comprises a foam.

5. The method of claim 4, wherein the first thermoset material is a foam, and the second thermoset material is solid thermoset material.

6. The method of claim 1, wherein the second hardness is greater than the first hardness.

7. The method of claim 1, wherein the first hardness is greater than the second hardness.

8. The method of claim 4, wherein the first hardness is greater than the second hardness.

9. The method of claim 1, wherein the first thermoset material and the second thermoset material are deposited to form a continuous functionality graded hardness gradient from the first hardness to the second hardness.

10. The method of claim 1, wherein the first thermoset material and the second thermoset material are deposited to form a non-linear functionality graded hardness gradient from the first hardness to the second hardness.

11. The method of claim 1, wherein the robotic end effector comprises at least two fingers.

12. The method of claim 1, wherein the deformable pad has a corrugated surface.

13. A robotic end effector comprising a finger comprising a first thermoset material having a first hardness and a second thermoset material having a second hardness different from the first hardness, wherein the first thermoset material is connected to the second thermoset material to form at least a portion of the finger of the robotic end effector, wherein at least a portion of the first thermoset material and the second thermoset material form a deformable pad of the finger, wherein the first thermoset material is present as one or more layers in the deformable pad of the finger and the second thermoset material is present as one or more layers in the deformable pad of the finger and the deformable pad of the finger further comprises (a) a first sensor embedded in the deformable pad of the finger, wherein the first sensor is disposed below the at least one layer of the first thermoset material, and (b) a second sensor embedded in the deformable pad of the finger, wherein the second sensor is disposed above the at least one layer of the first thermoset material in the deformable pad of the finger and below the at least one layer of the second thermoset material in the deformable pad of the finger.

14. The robotic end effector according to claim 13, wherein the first sensor is disposed between two layers of the first or second thermoset material and the second sensor is disposed between a layer of the first thermoset material and a layer of the second thermoset material.

15. The robotic end effector according to claim 13, wherein the first thermoset material and the second thermoset material form a continuous functionality graded hardness gradient from the first hardness to the second hardness.

16. The robotic end effector according to claim 13, wherein the second hardness is greater than the first hardness.

17. The robotic end effector according to claim 13, wherein the first hardness is greater than the second hardness.

* * * * *